United States Patent
Shin et al.

(10) Patent No.: US 12,272,027 B2
(45) Date of Patent: Apr. 8, 2025

(54) IMAGE RESTORATION METHOD AND APPARATUS

(71) Applicant: PIXTREE Inc., Seoul (KR)

(72) Inventors: Jaeseob Shin, Seoul (KR); Sungul Ryoo, Seoul (KR); Sehoon Son, Seoul (KR); Hyeongduck Kim, Gyeonggi-do (KR); Hyosong Kim, Seoul (KR)

(73) Assignee: PIXTREE Inc. (KR)

( * ) Notice: Subject to any disclaimer, the term of this patent is extended or adjusted under 35 U.S.C. 154(b) by 358 days.

(21) Appl. No.: 17/771,007

(22) PCT Filed: Oct. 13, 2020

(86) PCT No.: PCT/KR2020/013937
§ 371 (c)(1),
(2) Date: Apr. 21, 2022

(87) PCT Pub. No.: WO2021/080233
PCT Pub. Date: Apr. 29, 2021

(65) Prior Publication Data
US 2023/0005114 A1    Jan. 5, 2023

(30) Foreign Application Priority Data

Oct. 21, 2019   (KR) .................. 10-2019-0130542

(51) Int. Cl.
*G06T 5/50*      (2006.01)
*G06T 3/40*      (2024.01)
(Continued)

(52) U.S. Cl.
CPC .............. *G06T 5/50* (2013.01); *G06T 3/4053* (2013.01); *G06T 5/20* (2013.01); *G06T 5/70* (2024.01);
(Continued)

(58) Field of Classification Search
CPC .......... G06T 5/50; G06T 3/4053; G06T 5/20; G06T 5/70; G06T 2207/20076;
(Continued)

(56) References Cited

U.S. PATENT DOCUMENTS

| | | | |
|---|---|---|---|
| 10,229,478 B2 * | 3/2019 | Prasad | G06T 5/00 |
| 2020/0090306 A1 * | 3/2020 | Cho | G06N 3/08 |
| 2020/0117949 A1 * | 4/2020 | Kimura | G06N 3/045 |

FOREIGN PATENT DOCUMENTS

| | | | | |
|---|---|---|---|---|
| JP | 2012059118 A | * | 3/2012 | |
| KR | 2005122845 A | * | 12/2005 | G06T 5/003 |

(Continued)

OTHER PUBLICATIONS

International Search Report for PCT/KR2020/013937 mailed Jan. 15, 2021.
Written Opinion for PCT/KR2020/013937 mailed Jan. 15, 2021.

*Primary Examiner* — Oneal R Mistry
*Assistant Examiner* — Jongbong Nah
(74) *Attorney, Agent, or Firm* — Renaissance IP Law Group LLP (57) ABSTRACT

The present embodiment provides an image restoration method and apparatus which generate independent different restoration models by performing learning for each of different resolutions, receive a distorted image, and apply a restoration model corresponding to the resolution of the distorted image among the independent different restoration models to restore the distorted image into an improved upscaled image centering on a restoration target object within the distorted image.

15 Claims, 8 Drawing Sheets

(51) Int. Cl.
  *G06T 3/4053* (2024.01)
  *G06T 5/00* (2024.01)
  *G06T 5/20* (2006.01)
  *G06T 5/70* (2024.01)
  *G06V 10/77* (2022.01)

(52) U.S. Cl.
  CPC .................. *G06V 10/7715* (2022.01); *G06T 2207/20076* (2013.01); *G06T 2207/20081* (2013.01); *G06T 2207/20084* (2013.01); *G06T 2207/20212* (2013.01); *G06T 2207/30168* (2013.01); *G06T 2207/30201* (2013.01)

(58) Field of Classification Search
  CPC . G06T 2207/20081; G06T 2207/20084; G06T 2207/20212; G06T 2207/30168; G06T 2207/30201; G06T 5/60; G06V 10/7715; G06V 10/82; G06V 40/169
  See application file for complete search history.

(56) References Cited

FOREIGN PATENT DOCUMENTS

| | | | |
|---|---|---|---|
| KR | 20050122845 | A | 12/2005 |
| KR | 20190058285 | A | 5/2019 |
| KR | 20190096295 | A | 8/2019 |
| KR | 102034248 | B1 | 10/2019 |

\* cited by examiner

FIG. 1A          FIG. 1B          FIG. 1C

64x64          CNN result          Our result

FIG. 2 clean image $x$ → Unknown degradation → observed image $y$ → Restoration → restored image $\hat{x}$ MAP: $\hat{x} = \arg\max_{x} P(x|y)$

$P(x|y) = \dfrac{P(y|x)P(x)}{P(y)} \propto P(y|x)P(x)$

— Likelihood: our knowledge of the degradation process (blur, noise, compression, etc.)

— Prior: our knowledge of the target clean image (clean-64x64, clean-2K, clean-4K, etc.)

FIG. 3 clean image $x$ → Unknown degradation[1,2] → observed image $y$ → Restoration → restored image $\hat{x}$ $$y = JPEG_q\left(\left(x + N_{\sigma;c}\right) \otimes K_s\right)$$

$N_{\sigma;c}$ : AWGN with channel dependent noise level $\sigma$
$K_s$ : blur kernel with size $s$
$JPEG_q$ : JPEG compression with quality $q$ $$\hat{x} = \arg\max_x P(y|x)P(x)$$
$$= \arg\min_x -\log P(y|x) - \log P(x)$$
$$= \arg\min_\theta E(x, G_\theta(y)) + \lambda R(x)$$

$$E = \|F(x) - F(G_\theta(y))\|_2^2 \quad R = -\log D_{\varphi;x}(G_\theta(y))$$

$F$ : (5,4)-th convolution map of face recognition network
$G_\theta$ : generator network (EDSR) with parameter $\theta$
$D_{\varphi;x}$ : discriminator network with parameter $\varphi$ given prior $x$

IMAGE RESTORATION METHOD AND APPARATUS

TECHNICAL FIELD

The present disclosure relates to an image restoration method and apparatus.

BACKGROUND ART

The content described below merely provides background information related to the present embodiment and does not constitute the conventional art.

In general, a technology for restoring a low-resolution image to a high-resolution image is divided depending on the number of input images used for restoration or a restoration technology. It is divided into a single image super-resolution image restoration technology and a continuous image super-resolution image restoration technology depending on the number of input images.

In general, the single image super-resolution image restoration technology has a faster processing speed than the continuous image super-resolution image restoration technology, but the quality of image restoration is low because information required for restoration is insufficient.

Since the continuous image super-resolution image restoration technology uses various features extracted from a plurality of consecutively acquired images, the quality of the restored image is superior to that of the single image super-resolution image restoration technology, but the algorithm is complex and the amount of computation is large so that real-time processing is difficult.

Depending on the restoration technology, there are a technique using an interpolation method, a technique using edge information, a technique using frequency characteristics, and a technique using machine learning such as deep learning. The technique using the interpolation method has a fast processing speed, but has a disadvantage in that the edge portions are blurred.

The technique using edge information not only has a high speed, but also can restore an image while maintaining the sharpness of edges, but has a disadvantage in that it may include a visually noticeable restoration error when the edge direction is incorrectly estimated.

The technique using the frequency characteristics can restore the image while maintaining the sharpness of the edges as in the technique using edge information by using the high frequency component, but has a disadvantage in that ringing artifacts near the boundary line occur. Finally, the technique using machine learning such as example-based or deep learning has the most excellent quality of restored images, but its processing speed is very slow.

As described above, the continuous image super-resolution image restoration technology among the various existing high-resolution image restoration technologies may be applied to fields that require a digital zoom function using the existing interpolation method, and provides superior quality of images compared to an interpolation method-based image restoration technology. However, in the existing super-resolution image restoration technology, the technology applicable to electro-optical equipment requiring limited resources and real-time processing is limited due to the complex amount of computation.

The existing single image super-resolution image restoration technology capable of real-time processing has a problem in that performance is greatly deteriorated compared to the continuous image super-resolution image restoration technology when image magnification is required to a high magnification of 2 times or more.

DISCLOSURE

Technical Problem

An object of the present embodiment is to provide an image restoration method and apparatus which generate independent different restoration models by performing learning for each of different resolutions, receive a distorted image, and apply a restoration model corresponding to the resolution of the distorted image among the independent different restoration models to restore the distorted image into an improved upscaled image centering on a restoration target object within the distorted image.

Technical Solution

According to an aspect of the present embodiment, there is provided an image restoration apparatus characterized by including a receiver for receiving an image and a processor for processing the image through convolution operation and non-linearization, wherein the processor includes: a learning unit that receives a plurality of images having different resolutions and performs learning for each of the different resolutions to learn an independent restoration model for each resolution; a selection unit that, when receiving a distorted observed image y, analyzes the resolution of the distorted observed image y to select a suitable restoration model; and an image restoration unit that generates a restored image x^ in which the observed image is restored by using a restoration model corresponding to the resolution of the observed image y among independent restoration models that are different for each resolution.

According to another aspect of the present embodiment, there is provided an image restoration method characterized by comprising: a learning process of receiving a plurality of images having different resolutions and performing learning for each of the different resolutions to learn an independent restoration model for each resolution; a selection process of selecting a suitable restoration model by analyzing the resolution of the distorted observed image y when the distorted observed image y is received; and an image restoration process of generating a restored image x^ in which the observed image is restored by using a restoration model corresponding to the resolution of the observed image y among independent restoration models that are different for each resolution.

Advantageous Effects

According to the present embodiment as described above, there is an effect capable of restoring the distorted image into an improved upscaled image centering on a restoration target object within the distorted image by performing learning for each of the different resolutions to generate independent different restoration models, receiving a distorted image, and applying a restoration model corresponding to the resolution of the distorted image among the independent different restoration models.

EXPLANATION OF REFERENCE NUMERALS

700: Image restoration apparatus
710: Learning unit
712: generator (G) 714: Discriminator (D)
720: Image restoration unit

MODE FOR INVENTION

Hereinafter, the present embodiment will be described in detail with reference to the accompanying drawings.

FIG. 1 is a view showing an input image and an output image according to the present embodiment.

The image restoration apparatus 700 according to the present embodiment applies Generative Adversarial Networks (GAN) to the distorted image and outputs it as an upscaled image.

The image restoration apparatus 700 restores the distorted image into an upscaled image by improving centering on the restoration target object within the distorted image.

Figure 1A:
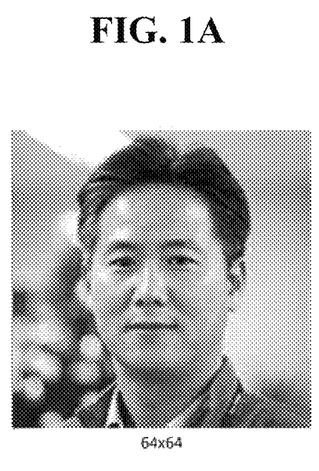
FIG. 1 is a view showing an input image and an output image according to the present embodiment.
Figure 1B:
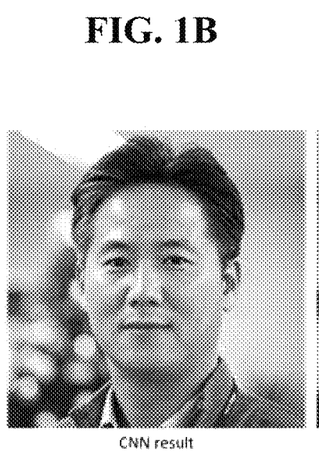
Figure 1C:
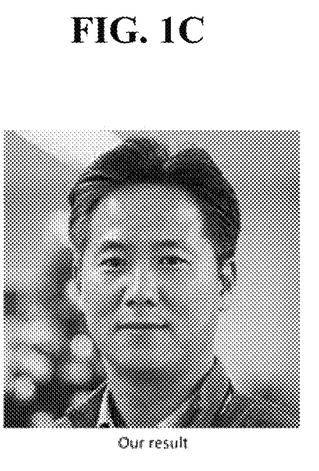

As shown in FIG. 1A, when a 64×64 distorted image is restored, it may be restored to the conventional extent shown in FIG. 1B, but the image restoration apparatus 700 according to the present embodiment may restore the distorted image to a level of upscaled image as shown in FIG. 10.

Figure 2:
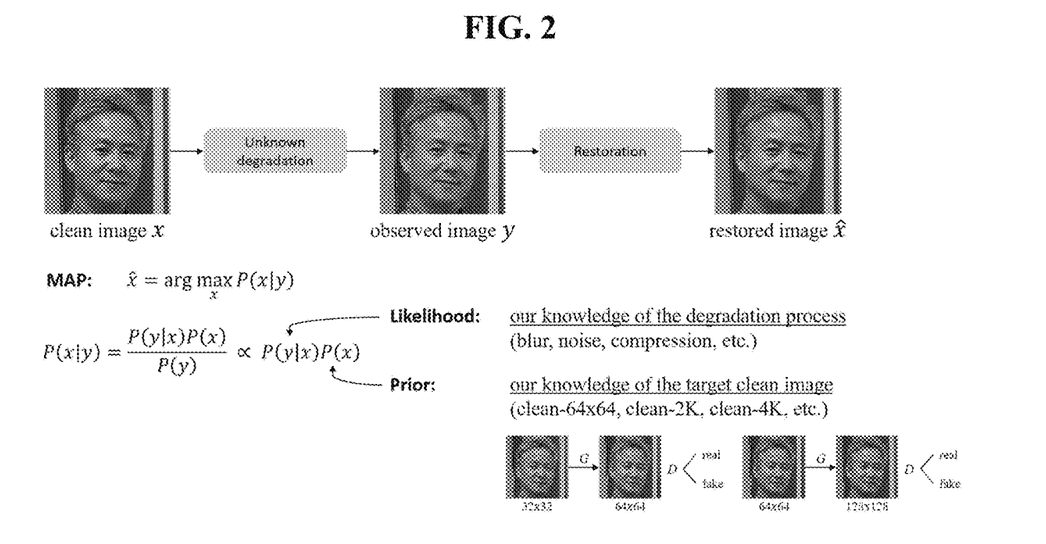
FIG. 2 is a view for explaining an image restoration process according to the present embodiment.

FIG. 2 is a view for explaining an image restoration process according to the present embodiment.

When the original image (clean image x) exists, distortion may occur in the original image x due to various causes. As shown in FIG. 2, unknown distortions (caused by blur, noise, compression, etc.) occur in the original image x so that the observed image y is distorted.

The image restoration apparatus 700 generates a restored image x^ restored by applying a deep learning technique to the observed image y.

A generator 712 in Generative Adversarial Networks (GAN) generates a restoration upscaled image (64×64) using a CNN based on an input image (32×32).

The discriminator 714 in the GAN determines whether the upscaled image output from the generator (G) 712 is an original real image or a generated fake image. The discriminator (D) 714 in the GAN reverse-propagates the score that has determined whether the upscaled image output from the generator (G) 712 is an original (real) image or a generated fake image, and GAN performs learning to generate a generated fake upscaled image like the original (real) one in order to increase the score for determining whether it is an original (real) image or a generated fake image.

The relationship between the observed image y and the original image x may be expressed by [Equation 1].

$$P(x|y) = \frac{P(y|x)P(x)}{P(y)} \propto (y|x)P(x)$$ [Equation 1]

(y|x) obtains an observed image y that is a distorted image from the original image x so that there may be a likelihood of modeling the confirmed distortion knowledge such as blur, noise, compression, or the like.

P(x) is a prior term, and knowledge of the original image x may be modeled.

The discriminator (D) 714 itself models probability distributions for p(x) and determines whether it is an original (real) image or a generated fake image based on how similar the distances between the probability distributions are. The discriminator (D) 714 itself represents the prior term.

In general, when it is assumed that a 32×32 image is modeled as a 64×64 image or a 64×64 image is modeled twice as a 128×128 image, the discriminator (D) inputs an image with twice lower resolution, and learns based on an image with twice higher resolution as the correct answer (output).

However, in this learning method, since the discriminator (D) itself models the probability distribution for the original image x (target image), if all images are set as the correct answer (output), the correct answer (output) for the 32×32 image is output as a 64×64 image, but the correct answer (output) for the 64×64 image has a problem that not only a 128×128 image is output, but also a 64×64 image is output as an original (real) image.

The image restoration apparatus 700 according to the present embodiment generates models independent from each other for each original image x (target image) and outputs the most suitable image.

Figure 3:
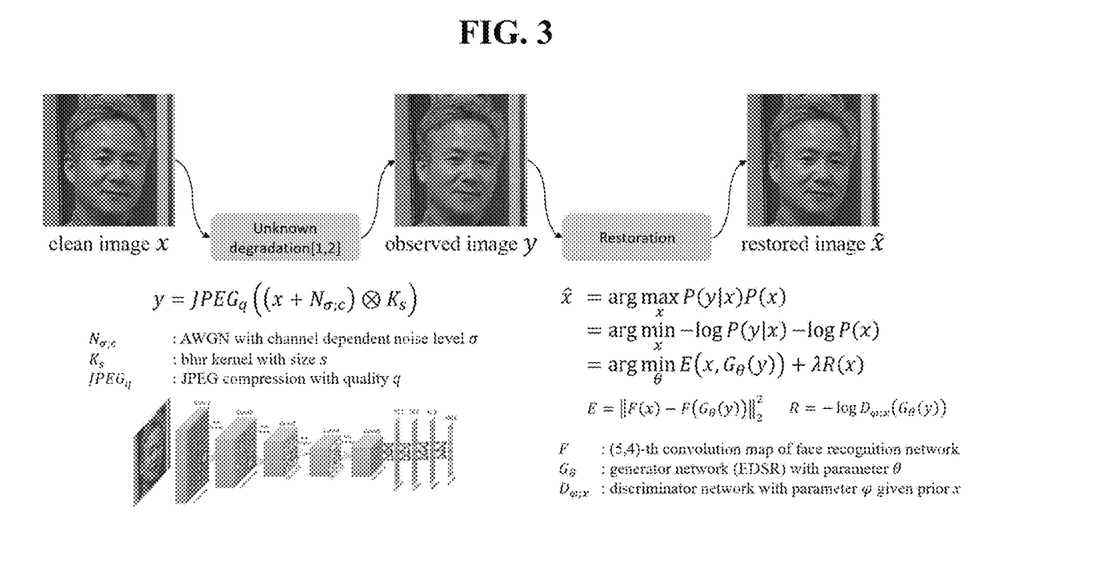
FIG. 3 is a view for explaining an observed image and a restored image according to the present embodiment.

FIG. 3 is a view for explaining an observed image and a restored image according to the present embodiment.

Since the image restoration apparatus 700 according to the present embodiment models knowledge of blur, noise, compression, etc., the image compression technique obtains a distorted observed image y as a result of compression in a state in which random noise is added from the original image x and the blur kernel is convolved.

The observed image y has the same value as in [Equation 2] due to distortion occurrence.

$$y = \text{JPEG}_q((x + N_{\sigma;c}) \otimes K_S)$$ [Equation 2]

$N_{\sigma;c}$: AWGN with channel dependent noise level
$K_S$: blur kernel with size s
$\text{JPEG}_q$: JPEG compression with quality q In other words, $N_{\sigma;c}$ means a noise level dependent on channel c. $K_S$ refers to blur kernel for size s. $\text{JPEG}_q$ means that JPEG compression is performed with compression quality q. Here, JPEG compression is an example and the present disclosure is not limited to a specific image/video compression technique.

The discriminator (D) 714 according to the present embodiment acquires a distorted image y and then performs learning based on a distorted observed image y and an original image x. That is, the image restoration apparatus 700 receives the distorted observed image y as an input, sets the original image x as the correct answer (output), and performs learning.

The image restoration apparatus 700 according to the present embodiment acquires the distorted observed image y, and then generates a restored image x^ based on the distorted observed image y and the original image x.

The image restoration apparatus 700 according to the present embodiment uses [Equation 3] in order to generate the restored image x^.

$$\hat{x} = \arg\max_{x} P(y|x)P(x) \quad \text{[Equation 3]}$$

$$= \arg\min_{x} -\log P(y|x) - \log P(x)$$

$$= \arg\min_{\theta} E(x, G_\theta(y)) + \lambda R(x)$$

$$E = \|F(x) - F(G_\theta(y))\|_2^2 \quad R = -\log D_{\varphi;x}(G_\theta(y))$$

F: (5,4)-th convolution map of object recognition network $G_\theta$: generator network (EDSR) with parameter $D_{\varphi;x}$: discriminator network with parameter $\varphi$ given prior x P(y|x) means a probability distribution modeling the distorted observed image y.

P(x) means a probability distribution of the original image x.

The restored image x^ has a value x for making the probability distribution P(y|x) modeling the distorted observed image y and the probability distribution P(x) of the original image x a maximum value.

The restored image x^ has a value x for making the probability distribution P(y|x) modeling the distorted observed image y taking −log and the probability distribution P(x) of the original image x taking −log a minimum value.

R(x) denotes a score that has determined whether the upscaled image output from the generator (G) 712 is an original (real) image or a generated fake image by the discriminator (D) 714 in the GAN.

$G_\theta(y)$ denotes a fake image generated by the generator (G) 712.

E denotes a value obtained by squaring the difference between the original image x and $G_\theta(y)$.

F refers to a network learned for object recognition.

As described in [Equation 1], the image restoration apparatus 700 can know that the model is separated and learned by Likelihood term and Prior term.

The image restoration apparatus 700 learns an independent model G depending on whether the target image as the correct answer is a 64×64 image, a 128×128 image, a 2 k image, a 4 k image, or an 8 k image according to the prior term. That is, the image restoration apparatus 700 should be provided with an independent model G for each resolution.

Since the image restoration apparatus 700 according to the present embodiment is mathematically modeled as in [Equation 1], learning is performed separately for each resolution. The image restoration apparatus 700 may model the distorted observed image y as in [Equation 2].

The image restoration apparatus 700 minimizes only the main features of a restoration target object by additionally implementing an object recognition network when minimizing the data term between the distorted observed image y and the correct answer image. Here, the object recognition network F extracts the features of the restoration target object while reducing the size of the convolutional map. For example, in an application example in which a target object to be restored is a face image, a face recognition network may be implemented to perform learning in a direction to minimize the difference between main features of the face.

The image restoration apparatus 700 calculates a score that has determined whether the upscaled image output from the generator (G) 712 is an original (real) image or a generated fake image by the discriminator (D) 714 in the GAN.

The discriminator (D) 714 determines whether the upscaled image output from the generator (G) is an original (real) image or a generated fake image based on learned information. Thereafter, the discriminator (D) 714 may be improved, which enables the learned information to be used without information on the correct answer as a criterion for determining whether it is an original (real) image or a generated fake image.

Thereafter, the image restoration apparatus 700 has a multi-scale structure in order to integrate the above-described process.

When an arbitrary distorted (degraded) image having various resolutions is input, the image restoration apparatus 700 upscales the distorted image to an upscaled image having a preset resolution (512×512). The image restoration apparatus 700 downscales (32×32, 64×64, 128×128) the upscaled image (512×512) to images back to preset multiples (2 times, 4 times).

Thereafter, the image restoration apparatus 700 generates data of different scales. The result is obtained by passing the upscaled image (512×512) through a network learned as an input.

The image restoration apparatus 700 passes the upscaled image (512×512) through the network learned as an input and generates images downscaled (32×32, 64×64, 128×128) back to the preset multiples (2 times, 4 times). The image restoration apparatus 700 generates the smallest image (32×32) first when performing downscaling. The image restoration apparatus 700 converts the smallest downscaled image (32×32) into an upscaled image (64×64).

The image restoration apparatus 700 generates an upscaled image (128×128) by combining the upscaled image (64×64) with the downscaled image (64×64). The image restoration apparatus 700 generates an upscaled image (256×256) by combining the upscaled image (128×128) with the downscaled image (128×128). The image restoration apparatus 700 generates an upscaled image (512×512) by combining the upscaled image (256×256) with the downscaled image (256×256). The image restoration apparatus 700 always seeks to obtain constantly good results regardless of different scales and different distortions.

The image restoration apparatus 700 generates an observed image y which has the original image x and is distorted, and restores the distorted observed image y to generate a restored image x^. The image restoration apparatus 700 repeatedly performs upscaling an input image to 512×512, generating the input image while lowering the resolution of the upscaled image to ½, ¼, ⅛, etc., and inputting the generated input image.

Figure 4:
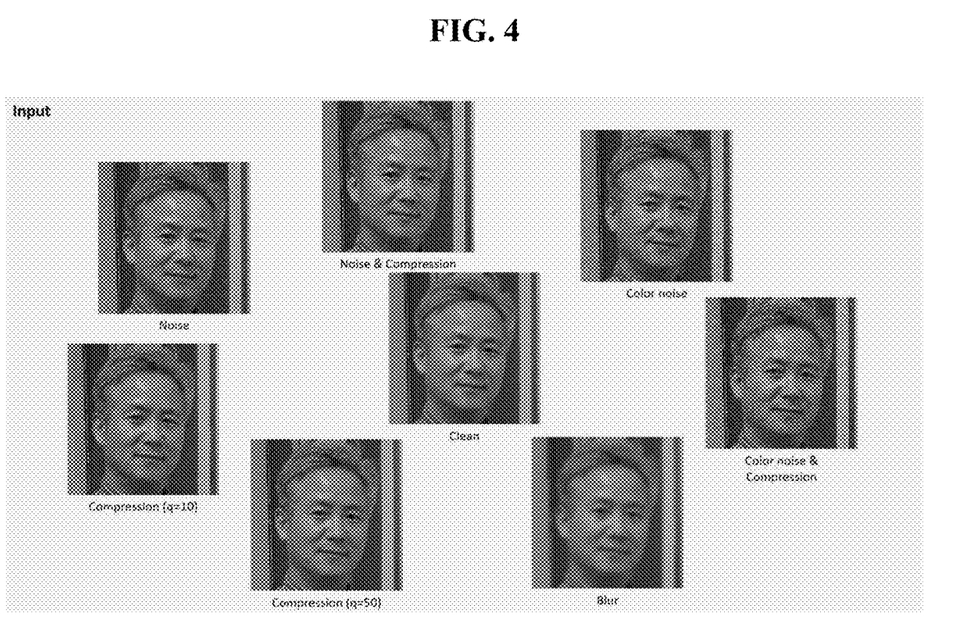
FIG. 4 is a view showing the distortion of observed images according to the present embodiment.

FIG. 4 is a view showing the distortion of observed images according to the present embodiment.

As shown in FIG. 4, the observed image y may be distorted in various forms with respect to the original image x. In other words, distortion as in the observed image y shown in FIG. 4 may occur due to a noise image, a blur image, a resize image, a compressed image, and a noise image and a compressed image with respect to the original image x.

Figure 5:
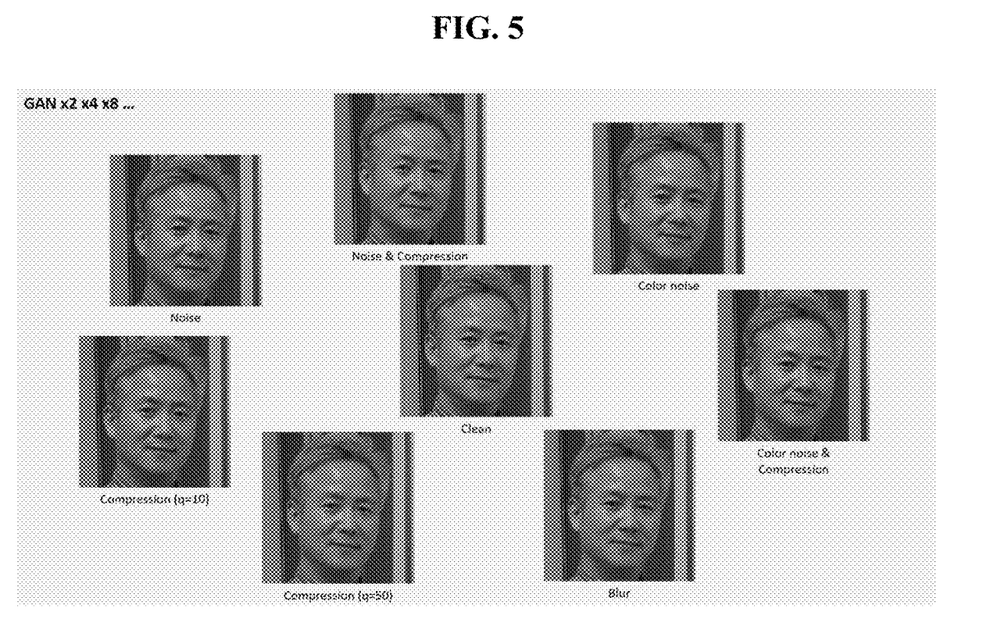
FIG. 5 is a view showing a restored image for each observed image according to the present embodiment.

FIG. 5 is a view showing a restored image for each observed image according to the present embodiment.

The results of generating a restored image x^ in the image restoration apparatus 700 by receiving various types of distorted observed images y shown in FIG. 4 are as shown in FIG. 5.

In other words, when the image restoration apparatus 700 receives and restores various types of distorted observed images y, a restored image is generated for each of the noise image, the blur image, the resized image, the compressed image, and the noise image and the compressed image as shown in FIG. 5.

Figure 6:
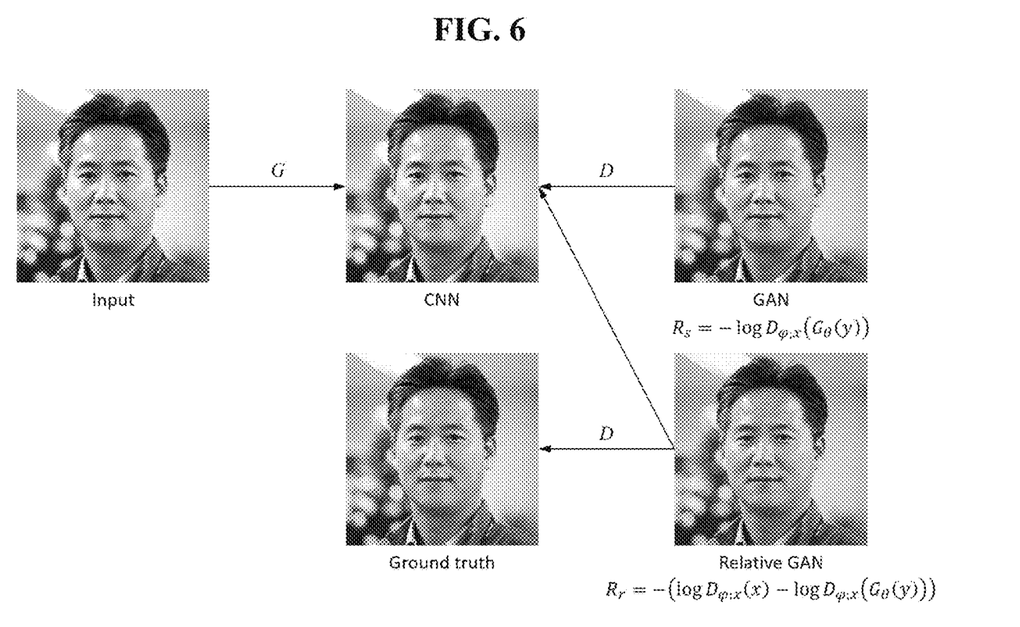
FIG. 6 is a view showing an original image, an observed image, and a generated fake image of an input image according to the present embodiment.

FIG. 6 is a view showing an original image, an observed image, and a generated fake image of an input image according to the present embodiment.

In the process of generating a restored image in which an input image is restored by the image restoration apparatus 700 as shown in FIG. 6, the input image input to the generator (G) 712, the CNN image generated by the generator (G) 712, and the Ground-Truth image input to the discriminator (D) 714 are as shown in FIG. 6. The discriminator (D) 714 in the image restoration apparatus 700 calculates a score which has determined whether the upscaled image output from the generator (G) 712 is an original (real) image or a generated fake image.

The discriminator (D) 714 in the image restoration apparatus 700 determines whether the upscaled image output from the generator G is an original (real) image or a generated fake image based on the learned information. The image restoration apparatus 700 transfers the correct answer image (Ground-Truth) and the fake image (Relative-GAN) generated in the generator G together as a criterion for determining whether it is an original (real) image or a generated fake image by improving the performance of the discriminator (D) 714.

Figure 7A:
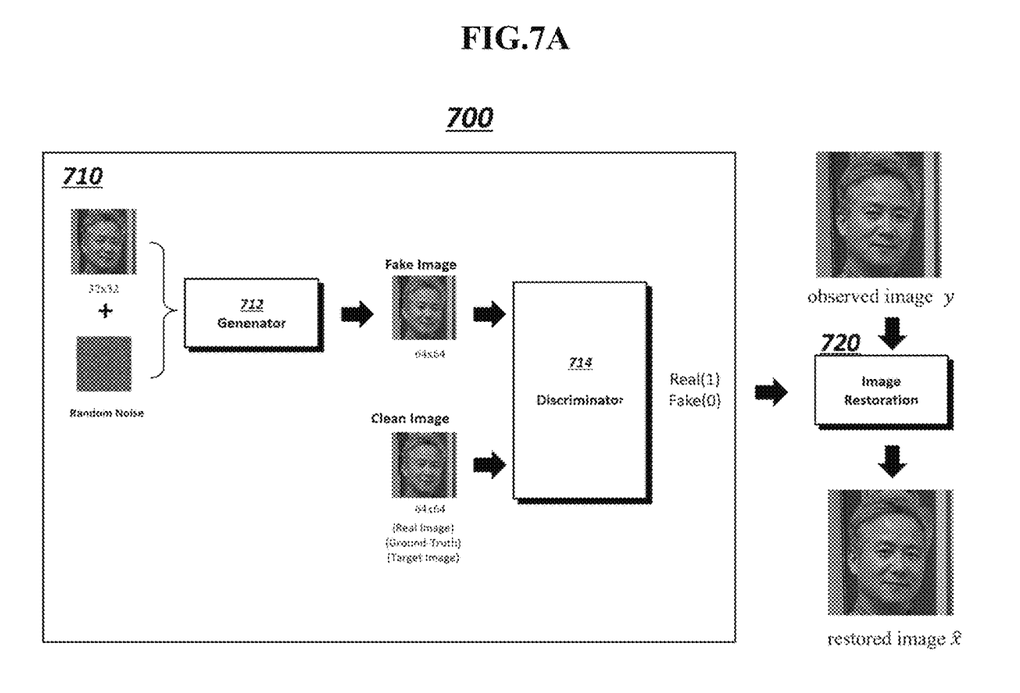
FIGS. 7A and 7B are views showing an image restoration apparatus according to the present embodiment.
Figure 7B:
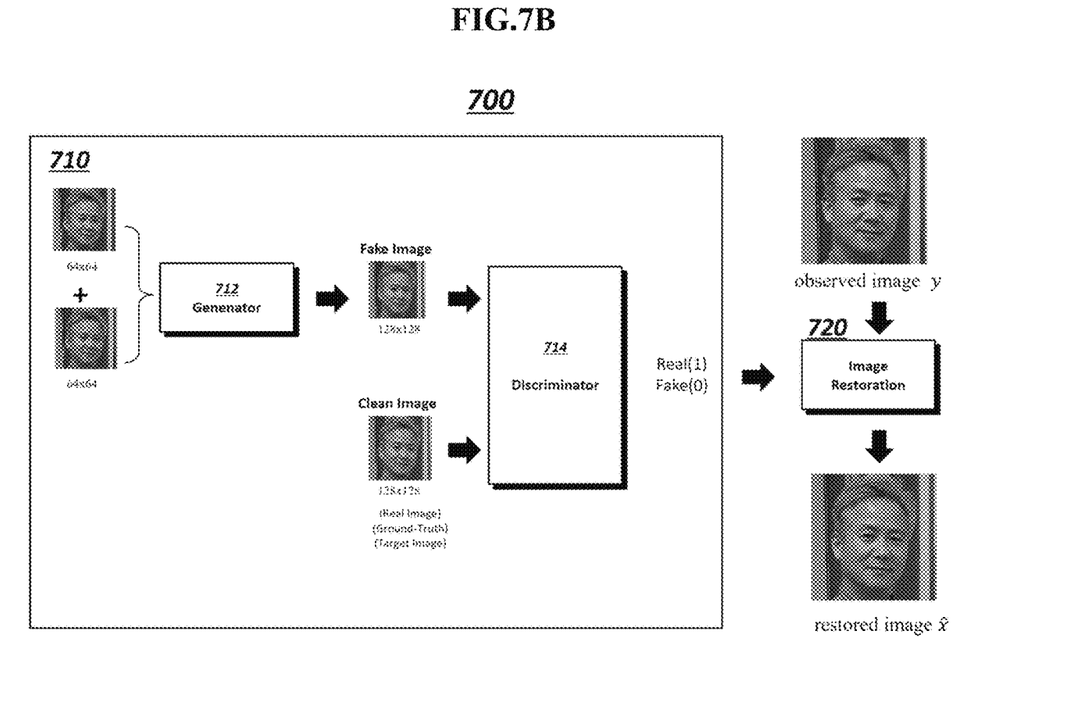

FIGS. 7A and 7B are views showing an image restoration apparatus according to the present embodiment.

The image restoration apparatus 700 according to the present embodiment includes a learning unit 710 and an image restoration unit 720. Components included in the image restoration apparatus 700 are not necessarily limited thereto.

The respective components included in the image restoration apparatus 700 may be connected to a communication path connecting a software module or a hardware module inside the apparatus so that they can operate organically with each other. These components communicate using one or more communication buses or signal lines.

Each component of the image restoration apparatus 700 shown in FIGS. 7A and 7B means a unit that processes at least one function or operation, and may be implemented by a software module, a hardware module, or a combination of software and hardware.

The learning unit 710 receives a plurality of images having different resolutions and performs learning for different resolutions to generate independent restoration models respectively that are different for each resolution.

The learning unit 710 includes a generator (G) 712 and a discriminator (D) 714.

The generator (G) 712 generates a restored image obtained by upscaling the resolution of the input image by a preset resolution.

The generator (G) 712 generates an upscaled image obtained by upscaling the input image to an image having a preset resolution. The generator (G) 712 repeats inputting the upscaled image as an input image while lowering the resolution to have a resolution of a preset ratio.

The discriminator (D) 714 receives the generated fake image and the original image x, and calculates a score that has determined whether the generated fake image is the original image or the generated fake image. The discriminator (D) 714 generates a restoration model for each resolution based on the score.

When the image restoration unit 720 receives a distorted observed image y, it generates a restored image x^ in which the observed image is restored by using a restoration model corresponding to the resolution of the observed image y among independent restoration models that are different for each resolution.

The observed image y has a value in which a blur kernel ($K_S$) for size and JPEG compression quality ($JPEG_q$) are applied to a channel-dependent noise level ($N_{o;c}$) value added to the original image x.

The image restoration unit 720 generates a restored image x^ allowing to have a value for making the probability distribution P(y|x) modeling the distorted observed image y and the probability distribution P(x) of the original image x a maximum value.

The image restoration unit 720 generates a restored image x^ allowing to have a value for making the probability distribution P(y|x) modeling the distorted observed image y taking −log and the probability distribution P(x) of the original image x taking −log a minimum value.

The image restoration unit 720 generates a restored image x^ from three of the original image (x), the fake image $G_\theta(y)$ generated by the generator (G) 712, and a parameter that minimizes E, a value obtained by squaring a difference between the original image x and the generated fake image $G_\theta(y)$, based on the score R(x) that has determined whether the image generated by the generator (G) 712 is an original (real) image or a generated fake image.

When the image restoration unit 720 generates the restored image x^, it applies a value obtained by extracting only the main features of the restoration target object while reducing the size of the convolution map by applying the object recognition network additionally implemented in order to minimize the data term between the distorted observed image y and the original image x.

The above description is merely exemplarily explaining the technical spirit of the present embodiment, and various modifications and variations will be possible without departing from the essential features of the present embodiment by those skilled in the art to which the present embodiment belongs. Accordingly, the present embodiments are intended to explain rather than limit the technical spirit of the present embodiment, and the scope of the technical spirit of the present embodiment is not limited by these embodiments. The protection scope of the present embodiment should be interpreted by the following claims, and all technical spirits within the scope equivalent thereto should be interpreted as being included in the scope of the present embodiment.

The invention claimed is:

1. An image restoration apparatus characterized by including:
   a receiver for receiving an image; and
   a processor for processing the image through convolution operation and non-linearization,
   wherein the processor includes:
      a learning module configured to receive a plurality of images having different resolutions and performs learning for each of the different resolutions to learn an independent restoration model for each resolution;
      a selection module configured to, when receiving a distorted observed image y, analyze the resolution of the distorted observed image y to select a suitable restoration model; and
      an image restoration module configured to generate a restored image x^ in which the observed image is restored by using a restoration model corresponding to the resolution of the observed image y among independent restoration models that are different for each resolution, wherein the learning module includes:
- a generator configured to generate a fake image that increases the resolution of the input image by a preset resolution;
- a discriminator configured to receive the generated fake image and the original image x, determine whether the generated fake image is an original (real) image or a fake image to calculate a score, and generate the restoration model for each resolution based on the calculated score.

2. The image restoration apparatus of claim 1, wherein the observed image y is characterized in that a channel-dependent noise, various intensities of blur, and image/video compression are applied to the original image x.

3. The image restoration apparatus of claim 1, wherein the image restoration module is configured to generate the restored image x^ allowing to have a value for making the probability distribution P(y|x) modeling the distorted observed image y and the probability distribution P(x) of the original image x a maximum value.

4. The image restoration apparatus of claim 1, wherein the image restoration module is configured to generate the restored image x^ allowing to have a value for making the probability distribution P(y|x) modeling the distorted observed image y taking −log and the probability distribution P(x) of the original image x taking −log a minimum value.

5. The image restoration apparatus of claim 1, wherein the image restoration module is configured to generate the restored image x^ that minimizes a difference between the original image x and the generated fake image Gθ(y) based on the score R(x) that has calculated whether a fake image generated by the generator is an original (real) image or a generated fake image by the discriminator.

6. The image restoration apparatus of claim 1, wherein the discriminator is configured to generate the restored image x^ allowing a difference between the corresponding scores to be minimized by relatively comparing the score that has calculated whether the fake image generated by the generator is an original (real) image or a generated fake image and the score that has calculated whether the original image is an original (real) image or a generated fake image.

7. The image restoration apparatus of claim 1, wherein the learning module is configured to learn a difference between the main features of the restoration target object extracted from the convolution map by passing through an object recognition network model in order to minimize a data term between the distorted observed image y and the original image x when the restored image x^ is generated.

8. The image restoration apparatus of claim 1, wherein the generator is characterized in that it repeats generating an upscaled image obtained by upscaling the input image to an image having a preset resolution, and inputting the upscaled image as an input image while lowering the resolution to have a resolution of a preset ratio.

9. An image restoration method characterized by comprising:
- a learning process of receiving a plurality of images having different resolutions and performing learning for each of the different resolutions to learn an independent restoration model for each resolution;
- a selection process of selecting a suitable restoration model by analyzing the resolution of the distorted observed image y when the distorted observed image y is received; and
- an image restoration process of generating a restored image x^ in which the observed image is restored by using a restoration model corresponding to the resolution of the observed image y among independent restoration models that are different for each resolution, wherein the learning process is characterized by including:
- a generation process of generating a fake image that increases the resolution of the input image by a preset resolution; and
- a discrimination process of receiving the generated fake image and the original image x, determining whether the generated fake image is an original image or a generated fake image to calculate a score, and generating the restoration model for each resolution based on the calculated score.

10. The image restoration method of claim 9, wherein the image restoration process is characterized by generating the restored image x^ allowing to have a value for making the probability distribution P(y|x) modeling the distorted observed image y and the probability distribution P(x) of the original image x a maximum value.

11. The image restoration method of claim 9, wherein the image restoration process is characterized by generating the restored image x^ allowing to have a value for making the probability distribution P(y|x) modeling the distorted observed image y taking −log and the probability distribution P(x) of the original image x taking −log a minimum value.

12. The image restoration method of claim 9, wherein the image restoration process is characterized by generating the restored image x^ that minimizes a difference between the original image x and the generated fake image Gθ(y) based on the score R(x) that has calculated whether a fake image generated in the generation process is an original (real) image or a generated fake image by the discriminator.

13. The image restoration method of claim 9, wherein the discrimination process is characterized by generating the restored image x^ allowing a difference between the corresponding scores to be minimized by relatively comparing the score that has calculated whether the fake image generated in the generation process is an original (real) image or a generated fake image and the score that has calculated whether the original image is an original (real) image or a generated fake image.

14. The image restoration method of claim 9, wherein the learning process is characterized by learning a difference between the main features of the restoration target object extracted from the convolution map by passing through an object recognition network model in order to minimize a data term between the distorted observed image y and the original image x when the restored image x^ is generated.

15. The image restoration method of claim 9, wherein the generation process is characterized in that it repeats generating an upscaled image obtained by upscaling the input image to an image having a preset resolution, and inputting the upscaled image as an input image while lowering the resolution to have a resolution of a preset ratio.

* * * * *